United States Patent
Gopalakrishnan

(10) Patent No.: US 9,501,474 B2
(45) Date of Patent: Nov. 22, 2016

(54) ENHANCED USE OF TAGS WHEN STORING RELATIONSHIP INFORMATION OF ENTERPRISE OBJECTS

(75) Inventor: Prasanth Gopalakrishnan, Kottayam (IN)

(73) Assignee: Oracle International Corporation, Redwood Shores, CA (US)

(*) Notice: Subject to any disclaimer, the term of this patent is extended or adjusted under 35 U.S.C. 154(b) by 1252 days.

(21) Appl. No.: 12/173,835

(22) Filed: Jul. 16, 2008

(65) Prior Publication Data

US 2010/0017378 A1 Jan. 21, 2010

(51) Int. Cl.
*G06F 17/30* (2006.01)

(52) U.S. Cl.
CPC .................... *G06F 17/30* (2013.01)

(58) Field of Classification Search
CPC .................................................. G06F 17/30
USPC ........................................ 707/816, 817, 776
See application file for complete search history.

(56) References Cited

U.S. PATENT DOCUMENTS

| | | | |
|---|---|---|---|
| 5,617,567 A | 4/1997 | Doktor | |
| 5,826,259 A | 10/1998 | Doktor | |
| 6,094,657 A | 7/2000 | Hailpern et al. | |
| 6,591,276 B1* | 7/2003 | Dockter et al. | 707/103 |
| 7,421,458 B1* | 9/2008 | Taylor et al. | 707/203 |
| 7,979,388 B2* | 7/2011 | Khoury | 707/609 |
| 2002/0091696 A1* | 7/2002 | Craft et al. | 707/10 |
| 2004/0015514 A1 | 1/2004 | Melton et al. | |
| 2004/0162815 A1 | 8/2004 | Irle et al. | |
| 2004/0230328 A1* | 11/2004 | Armstrong et al. | 700/83 |
| 2006/0041570 A1 | 2/2006 | Lowe et al. | |
| 2007/0016575 A1* | 1/2007 | Hurst-Hiller et al. | 707/5 |
| 2007/0124430 A1 | 5/2007 | Wright et al. | |
| 2007/0174247 A1 | 7/2007 | Xu et al. | |
| 2008/0016072 A1* | 1/2008 | Frieden et al. | 707/7 |
| 2008/0016098 A1 | 1/2008 | Frieden et al. | |

OTHER PUBLICATIONS

Borland, "StarTeam Extensions User's Guide", 2003.*
Honna Farah, "Applying Cognitive Patterns to Support Software Tool Development", 2006.*
"Wirehose Developer Center", "Wirehose Development Center—Content Management", "http://www.wirehose.com/developer/DeveloperOverview.html", Copyright Date: 2000-2008, pp. 1-6.
"Finding the Celtic", "http://celtic.ibiblio.org/howtouse.html#collecting", Downloaded circa: Mar. 28, 2008, pp. 1-10.
"BEA Systems, Inc.", "Introducing BEA Aqualogic® Pathways", "http://files.shareholder.com/downloads/BEAS/0x0x126743/37802f94-69e9-4f36-bf0e-a9b0d49591eb/AquaLogic%20Pathways%20Datasheet.pdf", Copyright Date: 1995-2007, pp. 1-13.

(Continued)

*Primary Examiner* — Mariela Reyes
*Assistant Examiner* — Dawaune Conyers
(74) *Attorney, Agent, or Firm* — Iphorizons PLLC; Narendra Reddy Thappeta

(57) ABSTRACT

A computing system provided according to an aspect of the present invention stores tags associated with relationships specified among objects. The tags can then potentially be used to search for objects of interest. In an embodiment, a search request is received indicating a first object, a second object and a search tag. A response is provided containing a sequence of objects and a sequence of relationships connecting the first object with the second object, with each relationship having an associated tag matching the search tag.

14 Claims, 10 Drawing Sheets

(56) References Cited

OTHER PUBLICATIONS

"Bluecat Networks", "Proteus Object Mapping", "http://www.bluecatnetworks.com/demo/object-tagging.pdf", Copyright Date: 2008, pp. 1-8.

"Terrell Russell", "Contextual Authority Tagging: Cognitive Authority Through Folksonomy", "http://www.terrellrussell.com/projects/contextualauthoritytagging/conauthtag200505.pdf", Date: May 2005, pp. 1-20.

"Oracle Business & Technology White Paper", "Folksonomy, Keywords, & Tags: Social & Democratic User Interaction in Enterprise Content Management", "http://www.oracle.com/technology/products/content-management/pdf/OracleSocialTaggingWhitePaper.pdf", Date: Jul. 2007, pp. 1-30.

"Flickr", "Flickr Tags", "http://www.flickr.com/help/tags/", Copyright Date: 2008, pp. 1-2.

* cited by examiner

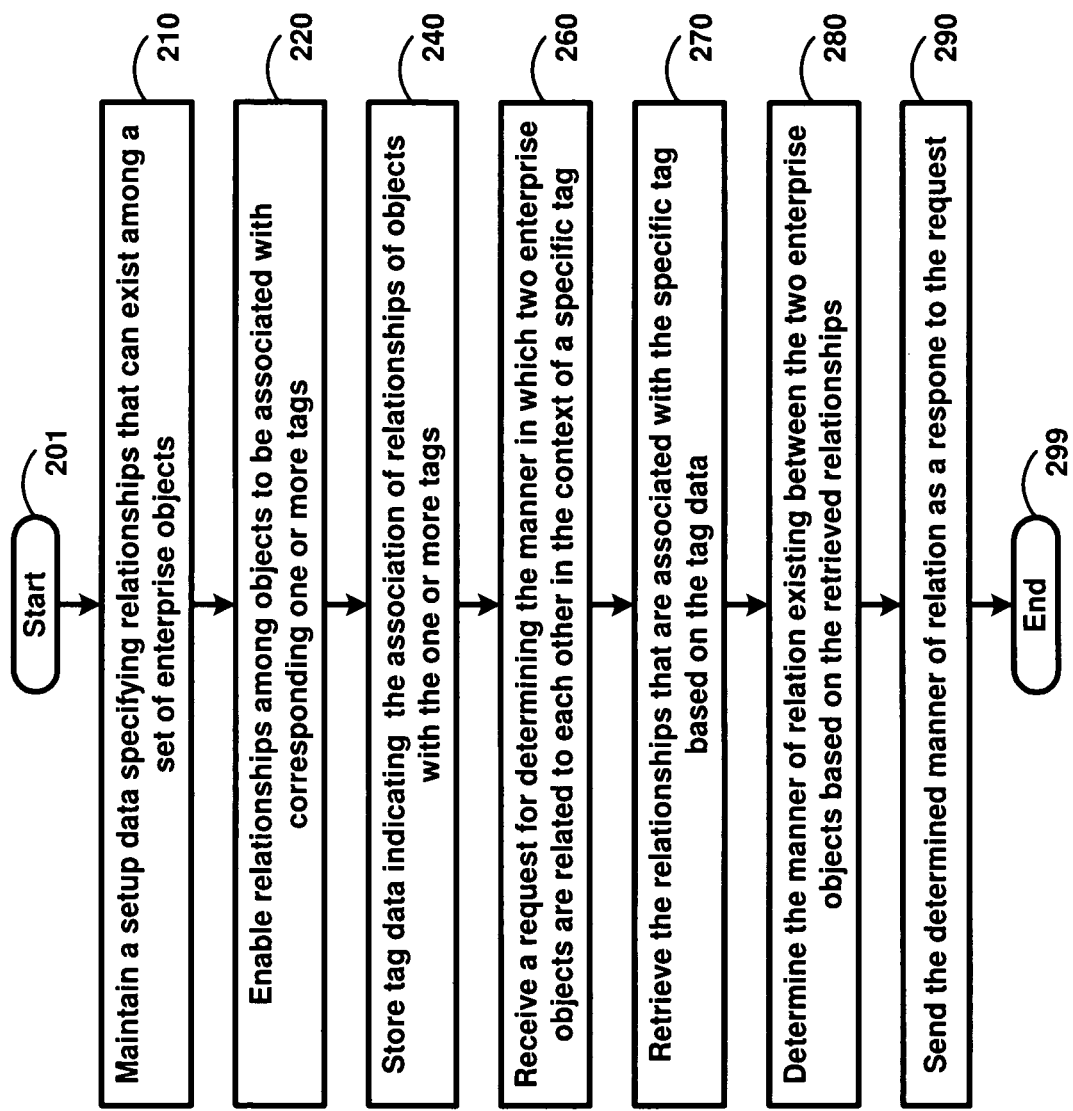

| | Object_Code | Object_Name | Object_Table | Object_ID_Column | Object_Display_Column | Self_Reference_Display |
|---|---|---|---|---|---|---|
| 321 → | CHANGE_ORDER | Change Order | Db1.Change_Orders | ChangeId | ChangeNum | which |
| 322 → | REVISED_ITEM_LINE | Revised Item Line | Db1.Revised_Items | RevisedItemId | RevisedItemId | which |
| 323 → | USER | User | Db2.Users | UserId | LoginName | who |
| 324 → | ITEM | Item | Db1.Items | ItemId | ItemNum | which |
| 325 → | ITEM_REVISION | Item Revision | Db1.Item_Revisions | RevisionId | RevisionId | which |
| 326 → | CUSTOMER | Customer | Db2.Customers | CustomerId | CustomerName | who |

| | Relationship_Code | Forward_Display_Name | Reverse_Display_Name |
|---|---|---|---|
| 351 → | CONTAINS | contains | is part of |
| 352 → | ASSIGNED_TO | assigned to | is assignee for |
| 353 → | REQUESTED_BY | requested by | requested |
| 354 → | REVISES | revises | is revised by |
| 355 → | CREATED | created | is created |
| 356 → | IS_ALSO | is | is |

| | SRC_Object_Code | Relationship_Code | DST_Object_Code |
|---|---|---|---|
| 381 → | CHANGE_ORDER | CONTAINS | REVISED_ITEM_LINE |
| 382 → | CHANGE_ORDER | ASSIGNED_TO | USER |
| 383 → | CHANGE_ORDER | REQUESTED_BY | USER |
| 384 → | REVISED_ITEM_LINE | REVISES | ITEM |
| 385 → | REVISED_ITEM_LINE | REVISES | ITEM_REVISION |
| 386 → | REVISED_ITEM_LINE | CREATED | ITEM_REVISION |
| 387 → | USER | IS_ALSO | CUSTOMER |

Enterprise Application

410 → Create Change order
　　　　Change Order Type ECO
425 → Change Order Number ECO123

420 — Cancel　Submit

430
*Change Order Name: ECO123
Description:
Source Type: [▼]
Priority: High [▼]
Reason: Cost [▼]
Source Name:
Need By Date:
Department:

Subject — 440
Item Number:
Item Description:
Project:
*Assigned To: Wilfred Gomes — 450
Revision:
Task:
Requestor: Jonathan Smith — 455

Revised Items — 460

| Select | *Item | Description | Item Type | From Revision | New Revision Lable | New Revision Code | *Schedule Date and Time |
|--------|-------|-------------|-----------|---------------|--------------------|-------------------|-------------------------|
| ⦿ | BX54888 | Box for AS54888 (qty 2) | | A-A ▸ | | | 23-Apr-2008 07:39:30 ← 471 |
| ○ | Pallet | Standard Pallet for Shipping | | A-A ▸ | B | B | 23-Apr-2008 07:39:30 ← 472 |
| ○ | | | | ▸ | | | |
| 481 | 482 | 483 | 484 | 485 | 486 | 487 | 488 |

FIG. 4

| | SRC_Object_Code | SRC_Object_Id | DST_Object_Code | DST_Object_Id | Relationship_Code | Tag_Type | Tag |
|---|---|---|---|---|---|---|---|
| 531 → | CHANGE_ORDER | 1001 | USER | 230 | ASSIGNED_TO | REL | Change Order:ECO123 |
| 532 → | CHANGE_ORDER | 1001 | USER | 451 | REQUESTED_BY | REL | Change Order:ECO123 |
| 533 → | CHANGE_ORDER | 1001 | REVISED_ITEM_LINE | 120 | CONTAINS | REL | Change Order:ECO123 |
| 534 → | CHANGE_ORDER | 1001 | REVISED_ITEM_LINE | 121 | CONTAINS | REL | Change Order:ECO123 |
| 535 → | REVISED_ITEM_LINE | 120 | ITEM | 100021 | REVISES | REL | Change Order:ECO123 |
| 536 → | REVISED_ITEM_LINE | 120 | ITEM_REVISION | 21001 | REVISES | REL | Change Order:ECO123 |
| 537 → | REVISED_ITEM_LINE | 121 | ITEM | 12014 | REVISES | REL | Change Order:ECO123 |
| 538 → | REVISED_ITEM_LINE | 121 | ITEM_REVISION | 31216 | CREATED | REL | Change Order:ECO123 |
| 539 → | USER | 451 | CUSTOMER | 100 | IS_ALSO | REL | _All_ |

*FIG. 5*

ENHANCED USE OF TAGS WHEN STORING RELATIONSHIP INFORMATION OF ENTERPRISE OBJECTS

BACKGROUND

Technical Field

The present disclosure relates to enterprise data management and more specifically to usage of tags when storing relationship information of enterprise objects.

Related Art

Enterprise objects are often used to model/represent physical or conceptual objects (business elements) according to the requirements of a specific business environment. Each enterprise object may contain data representing the characteristics of the corresponding physical/conceptual object being modeled.

For example, in an inventory management system, different enterprise objects may be defined corresponding to a customer, an order, an item, a vendor, etc. A "customer" enterprise object may contain data representing the name of the customer, the location of the customer, the order placed by the customer, etc. Such a representation facilitates convenient interaction between users and software systems.

Relationships often exist between the physical/conceptual objects being modeled. For example, a "customer" object may have a relationship with an "order" object in that the specific order is placed by the specific customer. Accordingly, relationship information is often stored to indicate such relationships.

Tags are often used in the storage of information. A tag generally contains text, which is commonly searched identify and/or to access specific enterprise objects of interest. For example, in an inventory management system, it may be desirable to find the enterprise objects representing the customer, the items, the vendor, etc., which are related to an order (another enterprise object). Tags may be stored associated with the objects to facilitate searching, as is well known in the relevant arts.

It may be desirable that the search facility provided for enterprise objects be improved, for example, to facilitate faster (more efficient) identification of the enterprise objects matching a desired criteria.

BRIEF DESCRIPTION OF THE DRAWINGS

Example embodiments of the present invention will be described with reference to the accompanying drawings briefly described below.

FIG. 2 is a flow chart illustrating the manner in which tags are stored associated with relationships and later used in a search in an embodiment of the present invention.

FIG. 3A is a table depicting the enterprise object types in one embodiment.

FIG. 3B is a table depicting the possible relationships between object types in one embodiment.

FIG. 3C is a table depicting the relationships existing between object types in one embodiment.

FIG. 4 depicts a screen triggering a transaction, which causes various enterprise objects to be formed in an embodiment.

FIG. 5 is a table illustrating the tag data in an embodiment.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

A computing system provided according to an aspect of the present invention stores tags associated with relationships specified among objects. In an embodiment, an enterprise application which forms and stores the objects (while processing transactions), interfaces with a tag tool which maintains tag data indicating the association of corresponding tags with respective relationships. The enterprise application forms the tags and association information, and interfaces with the tag tool to store the formed tags/information.

According to another aspect of the present invention, the tags are then used to search for objects of interest. In an embodiment, a search request is received indicating a first object, a second object and a search tag. A response is provided containing a sequence of objects and a sequence of relationships connecting the first object with the second object, with each relationship having an associated tag matching the search tag.

Several aspects of the invention are described below with reference to examples for illustration. However one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore the features/aspects described can be practiced in various combinations, though only some of the combinations are described herein for conciseness.

2. Example Environment

Figure 1:
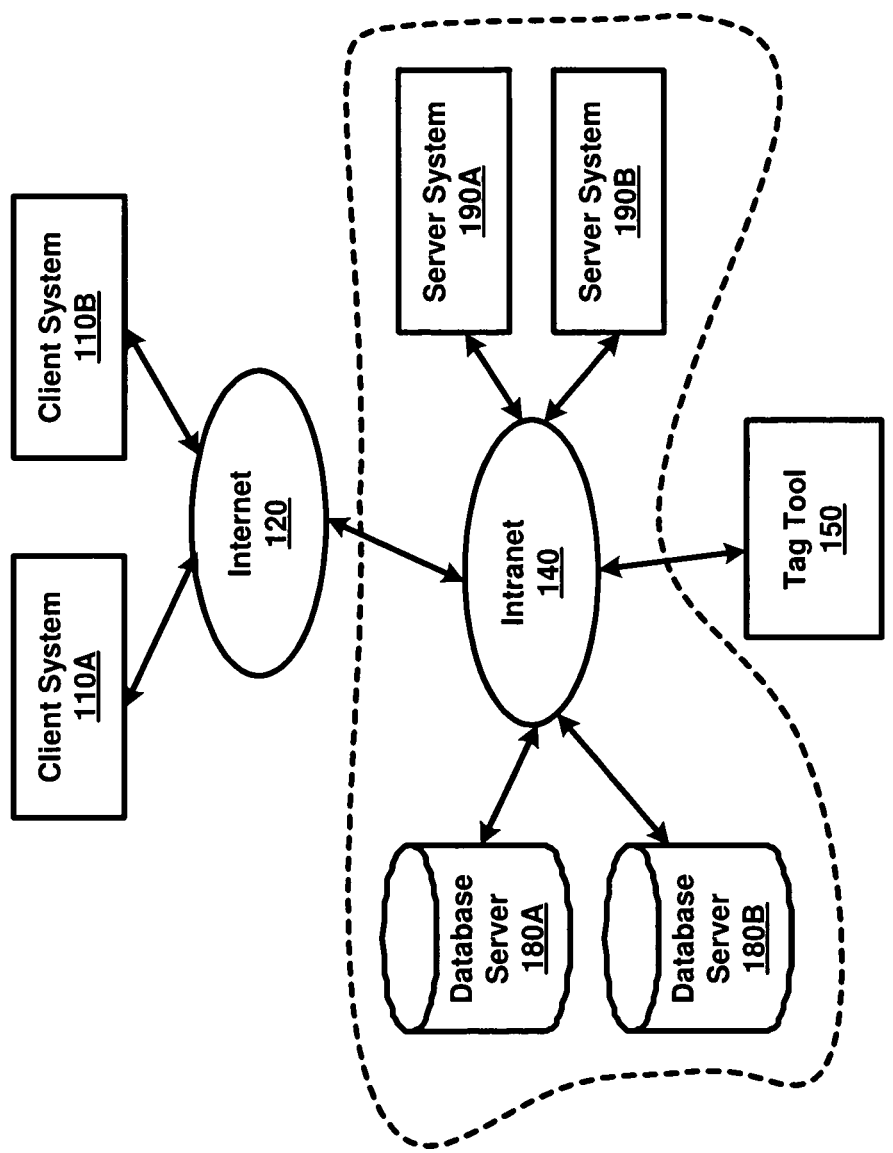
FIG. 1 is a block diagram illustrating an example environment in which several aspects of the present invention can be implemented.

FIG. 1 is a block diagram illustrating an example environment (computing system) in which several aspects of the present invention can be implemented. The block diagram is shown containing client systems 110A-110B, Internet 120, intranet 140, tag tool 150, database servers 180A-180B, and server systems 190A-190B.

Merely for illustration, only representative number/type of systems is shown in the Figure. Many environments often contain many more systems, both in number and type, depending on the purpose for which the environment is designed. Each system/device of FIG. 1 is described below in further detail.

Intranet 140 represents a network providing connectivity between server systems 190A-190B, and database servers 180A, 180B all provided within an enterprise (shown with dotted boundaries). Internet 120 extends the connectivity of these (in general, any system in the enterprise) with client systems 110A/110B.

Each of intranet 140 and Internet 120 may be implemented using protocols such as Internet Protocol (IP) well known in the relevant arts. In general, in IP environments, an IP packet is used as a basic unit of transport, with the source address being set to the IP address assigned to the source system from which the packet originates and the destination address set to the IP address of the target system to which the packet is to be eventually delivered.

Each of database servers 180A and 180B represents a non-volatile storage facilitating storage and retrieval of a collection of data (including the enterprise objects) by one or more (enterprise) applications executing in server systems 190A-190B (typically while processing various client requests).

In one embodiment, database servers 180A and 180B are implemented using relational database technologies and therefore provide storage and retrieval of data using structured queries such as SQL (Structured Query Language). SQL refers to a special-purpose, generally non-procedural language that supports the definition, manipulation, and control of data in systems implementing relational database technologies.

Each of client systems 110A-110B represents a system such as a personal computer, workstation, mobile station, etc., used by users to generate (client) transaction requests to software applications executing in server systems 190A-190B. The requests may be generated using appropriate interfaces. In general, a client system requests an application for performing desired tasks and receives corresponding responses containing the results of performance of the requested tasks.

Each of server systems 190A-190B represents a server, such as a web/application server, which executes business/enterprise applications capable of processing the transaction requests received from client systems 110A-110B. A server system may form (including modifications) objects as a part of such processing and store the objects in database servers 180A and/or 180B. The server system may further send the result of processing the transaction request to the requesting client system. Each of the server systems may also contain other software programs such as operating system, device drivers, etc., (not shown) that provides a (common) run time environment facilitating the execution of the business/enterprise applications.

Thus, an enterprise application (executing in server systems 190A-190B) may be designed to provide a corresponding set of enterprise objects for the specific business environment (for example, inventory management, human resource management, etc.). As such, a search facility may also be provided to users (using one of client systems 110A-110B) to enable identification of enterprise objects of interest, in particular, the objects related to a specific context.

In one prior approach, such a search facility requires the user to provide information regarding the enterprise objects of interest, such as, the data contained in the specific enterprise objects, the manner of matching data among different enterprise objects (according to the specific context), information associated with the enterprise objects etc. Such an approach may necessitate the user to spend considerable time/resources in locating desired/related enterprise objects.

Further, such an approach may necessitate the modification of the enterprise application when the search facility is desired to be extended to support other (types of) objects/relationships. It may be desirable that the search facility provided to the users be improved, at least to overcome some of the limitations described above with respects to the prior approach.

Tag tool 150 provided according to various aspects of the present invention associates tags with the relationships of objects and facilitates searches on the stored tags, thereby providing an improved search facility. Though described in relation with a single transaction/enterprise application in the description below, it should be appreciated that tag tool 150 may provide similar functionality for all the enterprise applications executing in the computing system of FIG. 1. The manner in which such facility can be provided is described below with examples in detail.

3. Searching for Enterprise Objects

FIG. 2 is a flowchart illustrating the manner in which enterprise objects are searched according to an aspect of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 201, in which control immediately passes to step 210.

In step 210, tag tool 150 maintains setup data specifying relationships that can exist among a set of enterprise objects. A relationship between two enterprise objects may represent a corresponding physical/conceptual relation existing between the corresponding physical/conceptual objects. Alternatively, (virtual) relationships may be specified to facilitate efficient identification/access of different enterprise objects. Setup data may be maintained either in database servers 180A-180B or in a local data store (not shown) associated with tag tool 150. The relationships can be determined by a designer of the enterprise system based on the specific information that can be contained in each of the enterprise objects.

In step 220, tag tool 150 enables relationships among objects to be associated with a corresponding one or more tags. In general, a tag is in the form of a keywords/text representing specific information of interest, and is used for later searching. The tag may be specified by a user (using one of client systems 110A-110B) or may be generated by enterprise applications (executing in server systems 190A-190B) in response to user interactions.

In step 240, tag tool 150 stores tag data indicating the association of relationships of objects with one or more tags. The tag data may be stored in a manner that facilitates the retrieval of relationships (and the corresponding enterprise objects) based on the associated tags (which may be received as a search criteria). The tag data may be stored in database server 180A-180B or a local data storage (not shown) associated with tag tool 150.

It may be appreciated that tag tool 150 may also be designed to maintain the stored tag data based on the enterprise object information modified during further transactions. For example, in response to the removal of an enterprise object from database server 180A-180B, tag tool 150 may remove all the relationships containing the enterprise object and the associated tags from the stored tag data.

Tag tool 150 may also enable the tags associated with the relationships to be updated, deleted and/or to be re-associated with other relationships.

In step 260, tag tool 150 receives a search request for determining the manner in which two (or more) enterprise objects are related to each other in the context of a specific tag. A request may be received from a user using one of client systems 110A-110B or enterprise applications executing on server systems 190A-190B (for example, when processing user requests). The search request may indicate a value for the specific tag and the two (or more) enterprise objects for which the manner of relation is to be determined. Such a search request may be received when a user (or an application) wishes to search for relationships that exist between two objects in a given context.

In step 270, tag tool 150 retrieves the relationships that are associated with the specific tag based on the tag data (in response to receiving the search request). The relationships may be retrieved from database server 180A-180B or local data storage associated with tag tool 150.

In step 280, tag tool 150 determines the manner of relation existing between the two (or more) enterprise objects based on the retrieved relationships. The manner of relation may indicate the direct relationship or indirect physical/conceptual relation existing between the two (first and second) enterprise objects. In the case of an indirect relation, it may be determined that the first and second objects are related through other intermediate objects (by relationships existing between the first, second and the intermediate objects as defined in the setup data).

Accordingly, the manner of relation may be determined to be the sequence of relationships existing between the first object through the intermediate objects to the second object. The determination may be performed in a known way, for example, using graph path finding algorithms (such as Dijkstra's algorithm) or goal-oriented logic programming constructs (for example, in a logic programming language such as PROLOG) as will be apparent to one skilled in the relevant arts.

In step 290, tag tool 150 sends the determined manner of relation as a response to the search request to client systems 110A-110B and/or server systems 190A-190B depending on whether the search request has been received from an user or an enterprise application. The enterprise application may then display the manner of relation on a user interface provided to a user. The flow chart ends in step 299.

Thus, by first enabling relationships to be associated with one or more desired tags (according to a specific context) and then providing a search for related objects based on the tags, searching for desired/related enterprise objects is improved. The manner in which such an improved search facility is provided in one embodiment is illustrated below with examples.

4. Example Illustrating Searching for Enterprise Objects

FIGS. 3A-3C, 4, 5, and 6A-6B together illustrate the manner in which searching for enterprise objects is improved in one embodiment. A brief overview of the search process is first provided, followed by a detailed description of each Figure.

Broadly, searching for enterprise objects is facilitated by first associating one or more tags with relationships existing among the enterprise objects (as specified by a setup data shown in FIG. 3A-3C). The association of specific tags to corresponding relationships may be performed by an enterprise application in response to a user interaction (FIG. 4). The specific tags and the corresponding associated relationships are stored in a tag data (FIG. 5).

Figure 6A:
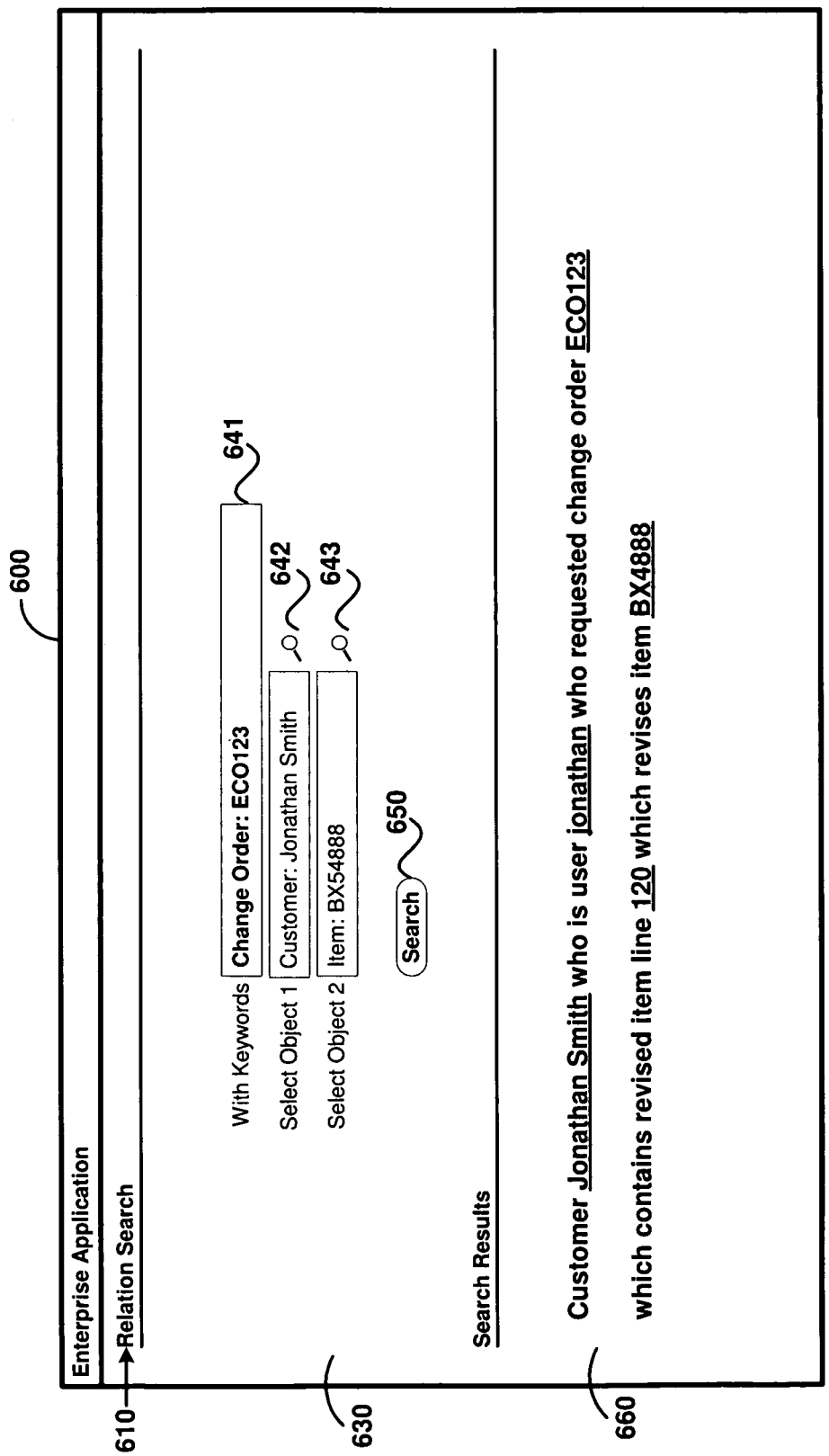
FIG. 6A is a user interface indicating the manner in which a user can specify a search request and the manner in which a response is shown in an embodiment.
Figure 6B:
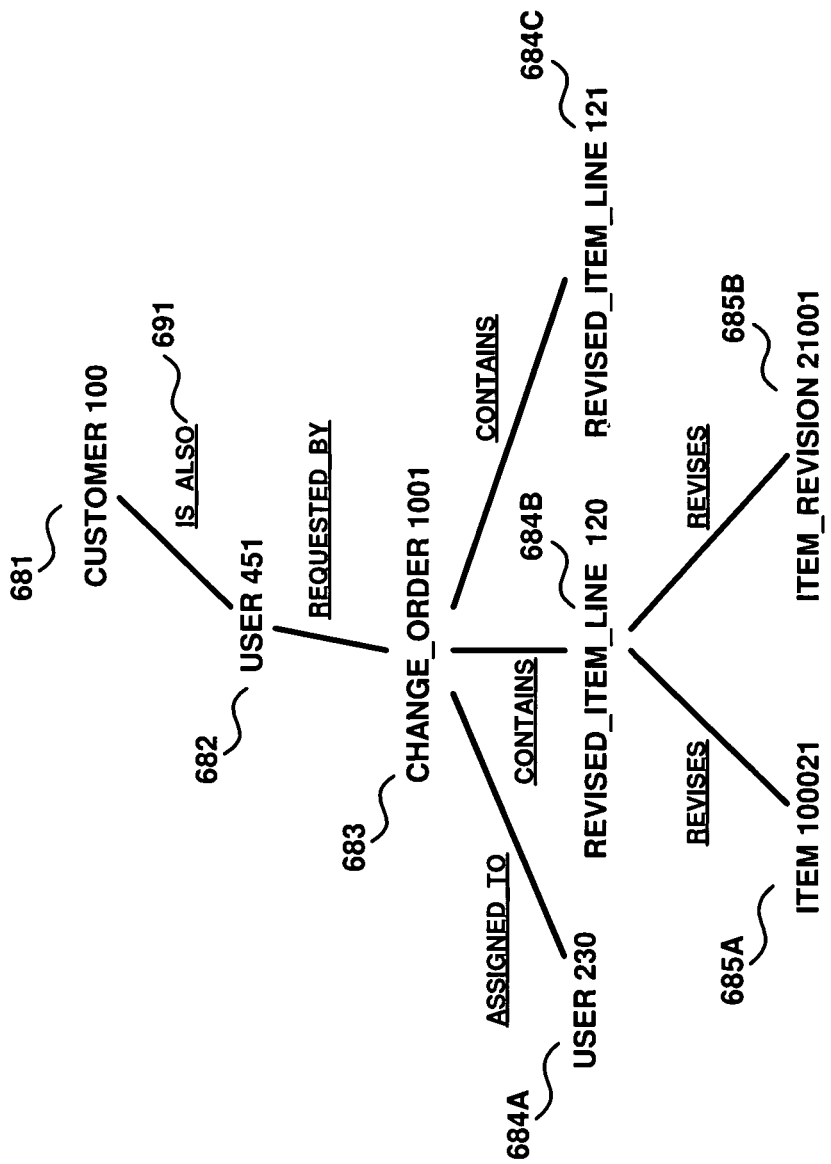
FIG. 6B depicts a tree illustrating the manner in which intermediate objects and relationships are determined in processing a search request in an embodiment.
Figure 7:
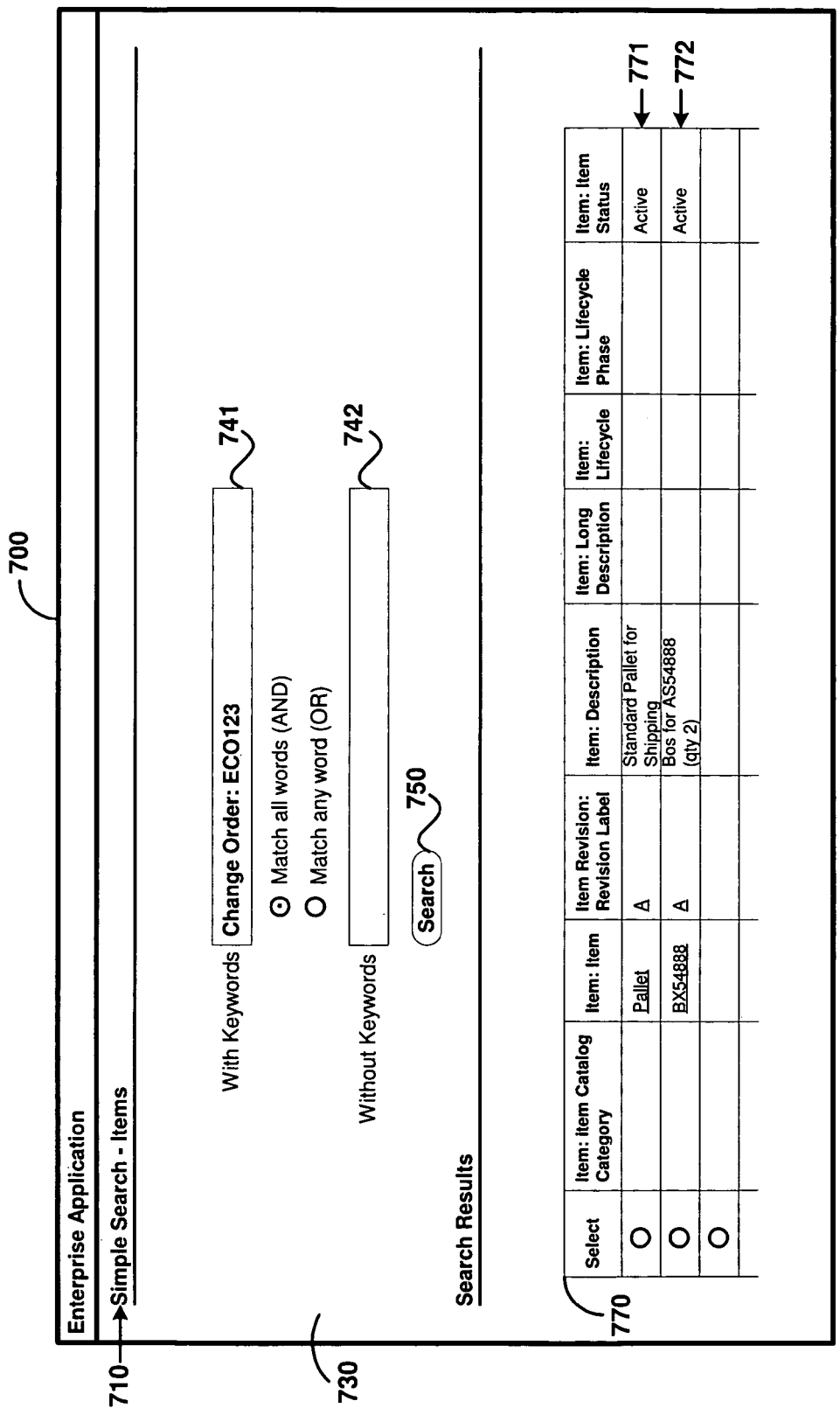
FIG. 7 is a user interface indicating the manner in which a user can retrieve all objects which are part of a relationship having an associated tag with content matching a search criteria.

In response to receiving a search request from a user (FIG. 6A), the manner of relation existing between two enterprise objects is determined in the context of a specific tag (indicated in the search request) as shown in FIG. 6B. A user may also be enabled to search for specific enterprise objects using the tags associated with the relationships as shown in FIG. 7.

The description is continued assuming that each row in a database table defined according to the specific business environment represents a corresponding enterprise object, with the columns in the database table representing corresponding attributes of the enterprise object. However, the various aspects of the present invention may be implemented in the context of other types of enterprise objects (such as in-memory structures, files/documents stored on a secondary storage etc.) as will be apparent to one skilled in the relevant arts by reading the disclosure provided herein.

As may be appreciated, the search process is facilitated by the setup data specifying the relationships existing among the enterprise objects (provided by an enterprise application). Accordingly, the manner in which setup data is maintained in one embodiment is described below with examples.

5. Setup Data

FIGS. 3A-3C together illustrate the manner in which relationships that can exist among a set of enterprise objects is maintained in an embodiment. The setup data may be generated/updated by tag tool 150 (or another tool not shown) and may be maintained either in database server 180A-180B or in a local database (not shown) associated with tag tool 150.

It may be appreciated that in the tables of FIGS. 3A-3C and 5, only the columns/rows as necessary for the specific embodiments/examples are included and described for conciseness. However various implementations can include other desired columns/rows without departing from the scope and spirit of several aspects of the present invention.

Referring to FIG. 3A, table 300 specifies the details of various (enterprise) object types provided by an enterprise application. Columns 311 "Object_Code" and 312 "Object_Name" respectively specifies a unique code and a name corresponding to each of the object types.

Column 313 "Object_Table" specifies the name of the specific table in the database containing the instances (conveniently referred to as "objects" elsewhere) of corresponding object types, while column 314 "Object_ID_Column" specifies the column name in the specific table which uniquely identifies each of the instances of the corresponding object types.

Accordingly, the rows in the specific table (specified by column 313) representing the instances of an object type are considered to be enterprise objects provided by the enterprise application. Each of the enterprise objects is uniquely identified by the value of the column/attribute specified by column 314. It may be appreciated that columns 313 and 314 may be modified to refer to other types of enterprise objects as well such as in-memory structures, files/documents stored on a secondary storage etc.

Column 315 "Object_Display_Column" specifies the column name in the specific table to be displayed while column 316 "Self_Reference_Display" specifies the text to be displayed when referring to a corresponding object type.

Each of rows 321-326 specifies the details of a corresponding enterprise object type. In particular, row 321 specifies that the object type is uniquely identified by the text "CHANGE_ORDER", is named "Change Order", and the instances of the object type (enterprise objects) are contained in the table "Db1.Change_Orders" ("Db1" representing the database, for example, in database server 180A) with each instance being uniquely identified by the column "ChangeId" in the table. Row 321 further indicates that the value in the column "ChangeNum" is to be displayed along with the self-reference display text "which" when referring to the object type Change_Order. Similarly, other rows 322-326 specify the details of other enterprise object types.

It may be observed that in column 313, the tables (containing the corresponding enterprise objects) may be present in different databases, for example, "Db1" (rows 321-322 and 324-325) and "Db2" (rows 323 and 326). The different databases may be maintained in the same or different database servers 180A and 180B. Thus, table 300 may provide details of all the enterprise object types provided by an enterprise application, irrespective of where the corresponding enterprise objects are stored.

Referring to FIG. 3B, table 330 specifies the details of the relationship types that may exist among enterprise objects (or object types). Column 341 "Relationship_Code" specifies a unique name/code for a corresponding relationship type existing between objects (or object types), while columns 342 "Forward_Display_Name" and 343 "Reverse_Display_Name" respectively specify the text to be displayed for a corresponding relationship type based on the context/direction in which the relationship is referred.

Each of the rows 351-356 specifies the details of a corresponding relationship type. In particular, row 351 indicates a relationship type uniquely identified by the code "CONTAINS" and having forward and reverse display texts respectively as "contains" and "is part of". Thus, in a scenario that a first object (type) and a second object (type) have a relationship of type CONTAINS, the forward and reverse display texts respectively describe the relationship with reference to the first object (that is, "first object contains second object") and the second object (that is, "second object is part of first object"). Similarly, rows 352-356 specify the details of other relationship types that may exist among enterprise objects (or object types).

Referring to FIG. 3C, table 360 specifies the relationships existing among the various object types (defined in table 300) provided by an enterprise application. The relationships are specified based on the relationship types specified in table 330.

It is assumed that each relationship exists between two object types (and correspondingly between two enterprise objects) for illustrative purposes. However, the setup data may be appropriately modified (for example, by indicating the cardinality of each relationship type in table 330, by providing additional columns in table 360, etc.) to specify relationships existing between 3 or more enterprise objects, as will be apparent to one skilled in the relevant arts by reading the disclosure provided herein.

Columns 371 "SRC_Object_Code" and 373 "DST_Object_Code" respectively specify the source/first object type and the destination/second object type between which a relationship exists, the relationship type of which is specified in column 372 "Relationship_Code". It may be observed that the values in column 371 and 373 correspond to the object type code values specified in column 311, and the values in column 372 correspond to the relationship type code values specified in column 341.

Each of the rows 381-387 specifies a corresponding relationship existing between a corresponding first and second object types. In particular, row 381 specifies a relationship of type "CONTAINS" existing between the first object type "CHANGE_ORDER" and the second object type "REVISED_ITEM_LINE". Accordingly, a first enterprise object (corresponding to a row in the table "Db1.Change_Orders") of object type "CHANGE_ORDER" may have the relationship "CONTAINS" with a second enterprise object (corresponding to a row in the table "Db1.Revised_Items") of object type "REVISED_ITEM_LINE".

Similarly, rows 382-387 specify the details of other relationships existing among the enterprise object (types) provided by an enterprise application. It may be observed that the same relationship type exists between different object types, for example, rows 384 and 385.

Thus, the relationships existing among the enterprise objects provided by an enterprise application are maintained in the form of setup data. It may be appreciated that the explicit maintenance of the object/relationship types in the form of the setup data (in contrast to implicit relationships defined among tables in a database) enables new/other desired objects/relationships to be added to extend the search facility to the new objects/relationships. An aspect of the present invention enables relationships of interest to be associated with one or more tags as described below with examples.

6. Associating Tags to Relationships among Enterprise Objects

FIGS. 4 and 5 together illustrate the manner in which tags are associated with relationships existing among enterprise objects in one embodiment. Broadly, an enterprise application (executing in server systems 190A-190B) associates pre-defined tags with pre-defined relationships (the tag data shown in FIG. 5) in response to a specific user interaction (using the interface of FIG. 4).

Referring to FIG. 4, display area 400 enables a user to create a change order transaction (as indicated by text 410). Display area 400 (as well as display areas 600 and 700) may be displayed on a display unit (not shown) associated with one of client systems 110A-110B, and a user may provide inputs using appropriate input devices associated with the client system. Display areas 400, 600 and 700 may be generated by enterprise applications executing in one of server systems 190A-190B or by a local application executing in one of client systems 110A-110B.

Display area 430 depicts information (such as the type, priority, name, description etc.) related to the change order being created. In particular, label 425 indicates the unique identifier "ECO123" associated with the change order being created. Display area 440 depicts other information related to change order such as the project name, the name of the assignee (text field 450), the name of the requester (text field 455) etc.

Table 460 (rows 471 and 472) depicts the details of the revised item lines (lines representing items which are sought to be revised) sought to be included in the change order being created. Columns 481-488 specify various details corresponding to each of the item lines. In particular, columns 482, 483, 485 and 486 respectively specify the unique identifier/name, description, the old revision, and the new revision of the item being revised corresponding to each of the item lines.

Button 420 (labeled "Submit") enables the user/administrator to send a request (by clicking/selecting the button) to the enterprise application for creating a new change order according to the information provided in display area 400.

In response to receiving such a request, the enterprise application may store the provided information in one or more databases maintained in database servers 180A-180B. Further, the enterprise application may associate pre-defined tags with a set of pre-defined relationships in response to receiving the request to create a new change order.

In one embodiment, the enterprise application is designed to associate the new change order number concatenated with the text "Change Order" (forming the tag "Change Order: ECO123") with the relationships existing between the change order and the assignee, the change order and the requestor, the change order and the revised item line, the revised item line and the item (being revised), and the revised item line and the revision.

However, in actual implementations, many more (and/or types of) relationships may be generated and the enterprise application may be designed to associate different tags (generated or user-specified) with different relationships. Enterprise application may also be designed to send requests to tag tool 150 for updating the object/relationship information based on further transactions (and/or user actions).

Accordingly, the enterprise application may be designed to send one or more requests for adding tags to each of the relationships to tag tool 150. The description is continued assuming that each request to tag tool 150 contains a source object type, a source object identifier, a destination object type, a destination object identifier (all based on the information in FIG. 3A), a relationship type (based on the information in FIG. 3B) and the tag to be associated. However, different types/number of requests may be used in other implementations designed for specific computing environments.

For example, to associate the above formed tag with the relationship existing between the change order and the assignee, the enterprise application may send a corresponding add tag request containing the source object type "CHANGE_ORDER", the source object identifier "1001", the destination object type "USER", the destination object identifier "230", the relationship type "ASSIGNED_TO" and the tag "Change Order:ECO123".

It may be appreciated that the object types (codes) may be determined based on the information in table 300 (of FIG. 3A), for example, based on the table names specified in column 313. The object identifiers may be determined from the specific table containing the enterprise objects. Accordingly, the object identifiers corresponding to the new change order and the user "Wilfred Gomes" may be respectively determined from the tables "Db1.Change_Orders" and "Db2.Users" (assumed to be "1001" and "230" respectively merely for illustration). The relationship type (as in FIG. 3B) may be hard-coded in the software instructions constituting the enterprise application.

Similarly, other add tag requests may be generated and sent by the enterprise application to tag tool 150. In response to a single add tag request, tag tool 150 may first verify the relationship, for example, to check whether the received relationship type exists between the received source and destination object types (based on the information in FIG. 3C). Tag tool 150 may then store the received tag associated with the relationship in the form of tag data described below with examples.

7. Tag Data

Referring to FIG. 5, table 500 depicts the tags associated with corresponding relationships. Columns 510 "SRC_Object_Code", 511 "SRC_Object_Id", 512 "DST_Object_Code", 513 "DST_Object_Id", and 514 "Relationship_Code" respectively specify the source object type, the source object identifier, the destination object type, the destination object identifier and the relationship type (all of which are specified in the add tag request).

Column 515 "Tag_Type" specifies the type of the tag (with the value "REL" indicating that the tag is associated with a relationship), while column 516 "Tag" specifies the tag associated with the relationship (received in the add tag request). Each of rows 531-539 specifies the tag associated with a corresponding relationship. For example, row 531 indicates that the relationship "ASSIGNED_TO" existing between a source/first enterprise object (having object type "CHANGE_ORDER" and unique identifier "1001") and a second/destination enterprise object (having object type "USER" and unique identifier "230") is associated with the tag "Change Order:ECO123".

Similarly, rows 532-539 specify other tags associated with corresponding relationships. It may be observed that rows 531-538 may be created by tag tool 150 in response to receiving add tag requests from an enterprise application (executing in one of server systems 190A-190B) subsequent to a user interaction, for example, using the interface depicted in FIG. 4.

Thus, row 531 indicates that the new change order (sought to be created by a user) is "assigned to" a first user (indicated by text field 450), while row 532 indicates that the change order is "requested by" a second user (as indicated by text field 455). Rows 533 and 534 indicate that the change order "contains" the revised item lines (corresponding to rows 471 and 472). Rows 535 and 536 respectively indicate that the item line of row 533 "revises" a first item with a corresponding first item revision (corresponding to the values of columns 482 and 487 of row 471). Similarly, rows 537 and 538 respectively indicate that item line of row 534 "revises" a second item with a corresponding second item revision (corresponding to the values of columns 482 and 487 of row 472).

It may be further observed that relationship depicted in row 539 (between a user and a customer) is associated with the tag "_ALL_", which indicates that the relationship is applicable in all contexts (and accordingly may be viewed as global relationships). In other word, all the relationships associated with the tag "_ALL_" are to be retrieved and used in determining the manner of relation existing between two enterprise objects.

It may be appreciated that column 516 is shown to contain a single tag value being associated with a corresponding relationship. However, multiple tag values may be associated with the same relationship, for example, by having a comma separated list of value in column 516, by having multiple tag value columns, by adding multiple rows associating different tag values with the same relationship etc. as will be apparent to one skilled in the relevant arts by reading the disclosure provided herewith.

Thus, tag tool 150 enables relationships existing among a set of enterprise objects to be associated with a corresponding one or more tags. Several aspects of the present invention enable searching of related objects in a specific context (indicated by a tag) as described below with examples.

8. Searching for Related Enterprise Objects

FIGS. 6A and 6B together illustrate the manner in which searching for related enterprise objects in a specific context is performed in one embodiment. Broadly, the search is performed for determining the manner of relation existing between two enterprise objects (that is, the manner in which the two enterprise objects are related to each other) in the context of a specific tag (indicating the specific context). Each of the Figures is described in detail below.

FIG. 6A depicts a portion of an interface using which a search request for determining the manner of relation between two enterprise objects in the context of a specific tag is generated in an embodiment. Display area 600 enables a user to search for relations existing between enterprise objects (as indicated by text 610), and accordingly identify the enterprise objects that are related to a specific context.

Display area 630 enables a user to specify the details of the search such as the specific tag "Change Order:ECO123" in text field 641, a first enterprise object "Customer: Jonathan Smith" in text field 642 and a second enterprise object "Item: BX54888" in text field 643. The user may then click/select button 650 (labeled "Search") to send a search request for determining the manner of relation between the first enterprise object and the second enterprise object in the context of the specific tag. The search request may be sent to tag tool 150 or an enterprise application executing in 190A-190B (which in turn, may forward the request to tag tool 150).

As such, on selection of button 650, a search request for determining the manner of relation between the customer enterprise object (having name "Jonathan Smith") and the item enterprise object (having item number "BX54888") in the context of the tag "Change Order: ECO123" is sent to tag tool 150.

In response to such a search request, tag tool 150 may determine and send the manner of relation existing between the first/customer enterprise object and the second/item enterprise object in the context of the specific tag (change order ECO123). The search results (the manner of relation) may be displayed in the form of a text containing links for objects and relationships as shown in display portion 660.

It may be appreciated that in alternative embodiments, the specific tag may be determined by the enterprise application, for example, based on the current context and/or user interface used by the user. Alternatively, the specific tag may be assigned by the enterprise application based on the context in which user performs the search. Further, the user may specify a text such as "Change Order:" in text field 641 indicating that the manner of relation between the first and second enterprise objects is to be determined in the context of all change orders (defined/stored in the enterprise).

The description is continued illustrating the manner in which the relation between the enterprise objects is determined in one embodiment, followed by the manner of the formation of the text shown in display portion 660.

9. Determining Manner of Relation

FIG. 6B depicts a tree structure generated during determination of the manner of relation between two (a first and a second) enterprise objects in the context of a specific tag in one embodiment. The tree structure may be generated by software instructions constituting tag tool 150 and may be maintained in a volatile memory.

In response to a search request tag tool 150 first retrieves the relationships that are associated with the specific tag based on the tag data (shown in FIG. 5), according to step 270. In one embodiment, tag tool 150 also retrieves the global relationships (tagged with the value "_ALL_") contained in the tag data.

Accordingly in response to the search request received on selection of button 650, tag tool 150 retrieves the relationships that are associated either with the tag "Change Order: ECO123" or the tag "_ALL_". Accordingly, tag tool 150 may retrieve rows 531-539 from the tag data depicted in table 500.

Tag tool 150 may then determine the object types and identifiers corresponding to the first/customer and second/item enterprise objects based on the data contained in FIG. 3A and the specific tables ("Db2.Customers" and "Db1.Items") containing the enterprise objects. Accordingly, the first and second enterprise objects may be respectively determined to be of object type "CUSTOMER" and "ITEM" having respective identifiers of "100" and "100021" (assumed merely for illustration). The object type and identifiers (in contrast to the user specified values such as the customer name and item number) may be needed to facilitate the determination of the manner of relation based on the tag data of table 500.

Tag tool 150 then creates the tree structure of 6B by making the first enterprise object as the root (node 681) of the tree. Tag tool 150 then identifies the set of enterprise objects that have at least one relationship with the first enterprise object based on the retrieved relationships. Accordingly, tag tool 150 may identify that the enterprise object of type "USER" having identifier "451" has a relationship with the customer object (as per row 539). Tag tool 150 may then add each of the identified set of enterprise objects as corresponding children (node 682) of the first enterprise object (node 681).

It may be observed that each of the nodes in the tree structure (representing corresponding enterprise objects) is shown labeled using the corresponding object type/code and identifier, such as "CUSTOMER 100" for node 681 representing the customer object. The solid lines between two nodes (681 and 682) represents the corresponding relationship existing between the objects (corresponding to the two nodes), with the corresponding label (691) indicating the relationship type/code "IS_ALSO" (shown underlined).

However, each node may be represented in memory as a data structure containing the relevant details of the corresponding enterprise object (for example, the information stored in the row corresponding to the enterprise object). In addition, the data structure may indicate the parent/child nodes along with the relationship types (corresponding to the solid lines shown in FIG. 6B). The tree/data structures and the determination of the manner of relation may be implemented in any convenient manner as will be apparent to one skilled in the relevant arts by reading the disclosure provided herewith.

Further, the description is continued assuming that only the relevant portions of the tree are generated at each step of processing. However, in alternative embodiments, the tree structure shown in FIG. 6B may be first constructed (with the first object as the root) and then the processing of the tree may be performed by using standard search algorithms such as depth-first search, breadth-first search for the second object in the constructed tree.

After identifying the set of enterprise objects related to the first object, tag tool 150 then checks whether the second/item object is contained in the identified set of objects. In a scenario that the second object is not contained in the identified set of objects, tag tool 150 selects one of the identified set of objects (related to the first object) as an intermediate object. Tag tool 150 then performs the above described steps of identification of another set of objects having a relationship with the intermediate object (and have not been already added to the tree), checking for inclusion of the second object in the another set and the selection of another intermediate object in a recursive/iterative manner until the second object is determined to be contained in the identified set of objects.

Thus, node 682 is selected as the intermediate object and a set of objects (containing the change order object having identifier 1001) is identified, which are related to the intermediate object (as per row 532) and which have not been already added to the tree (thereby excluding the customer object with identified 100 as per row 539). The identified change order object is then added to the tree as node 683.

Node 683 is then selected as the intermediate object and the set of related objects (as per rows 531, 533 and 534) is identified and added to the tree as corresponding nodes 684A-684C. As the second object is not contained in the identified set, node 684A is selected as the intermediate object and the corresponding set of related objects is determined to be empty (since all the related objects have already been added to the tree), indicating that the node is a leaf, and no further processing can be performed. Accordingly, processing continues by backtracking to the parent of node 684A and then selecting another intermediate node (for example, node 684B) in the set of related nodes for the parent node 683.

Backtracking may also occur in a scenario that processing of each of the set of related objects (after being selected as the intermediate object) results in backtracking—indicating that the second object is not contained in the sub-trees. In a scenario that backtracking reaches the root node (681), tag tool 150 may determine that the manner of relation between the first and second objects does not exist and send a corresponding message as a response to the search request.

Continuing with the processing of node 684B, the identified set of related objects is added as nodes 685A-685B. Since the identified set contains the second/item object (node 685A), tag tool 150 determines that the objects (and the relationships) forming the unique path between the first and second objects/nodes in the tree structure constitutes the manner of relation (requested). As such, the manner of relation may be determined to be {CUSTOMER 100, IS_ALSO, USER 451, REQUESTED_BY, CHANGE_ORDER 1001, CONTAINS, REVISED_ITEM_LINE, REVISES, ITEM 100021}.

Tag tool 150 may stop further processing/construction of the tree structure and then send the determined manner of relation as a response to the search request. The manner of relation may then be displayed on a display unit associated with the requesting system, for example, in display area 660 of FIG. 6A. Tag tool 150 may also order the results in the order of relevance based on the current context, the freshness of the tag and by listing the shorter paths first in a scenario where multiple results (manner of relations) are generated.

An aspect of the present invention displays the manner of relation in the form of a text (with links) which enables less-savvy computer users (such as business managers, top level management users, etc.) to better comprehend the relation existing between the first and second objects. The manner in which the manner of relation is displayed in one embodiment is described below with examples.

10. Displaying Manner of Relation

In one embodiment described below, tag tool 150 generates a search result in the form of a text based on the determined manner of relation and then sends the generated search result as the response to the search request. However, in alternative embodiments, the display text may be generated by applications executing in one of server systems 190A-190B and/or client system 110A-110B.

Tag tool 150 first determines the information to be displayed for each of the enterprise objects in the manner of relation. The displayed information may be determined based on concatenating the object name (indicated in column 312), the value of the display column (indicated in column 315) and the self reference display text (indicated in column 316) for each of the enterprise objects. For the second/last enterprise object, the self reference display text may not be concatenated.

Thus, for the customer object (having identifier 100), the information to be displayed is determined to be the concatenation of the object name "Customer", the value in the customer name column (assuming to be "Jonathan Smith") and the self reference display text "who" (as indicated by the columns 312, 315 and 316 of row 326 corresponding to the customer object type in FIG. 3A). Similarly, the information to be displayed for the other enterprise objects may be determined and substituted in the above manner of relation to generate {"Customer Jonathan Smith who", IS_ALSO, "user jonathan who", REQUESTED_BY, "change order ECO123 which", CONTAINS, "revised item line 120 which", REVISES, "item BX4888"}. It may be noted that the self reference display text "which" is not concatenated to the second/last enterprise object.

Tag tool 150 may then determine the information to be displayed for each of the relationships. For determining the displayed information for a specific relationship, tag tool 150 first identifies whether the manner of relation sequence contains the specific relationship in a forward or reverse direction based on whether the sequence contains the source object followed by the destination object (according to the tag data) or vice versa. The display information is then determined to be contained in column 342 if the specific relationship is in the forward direction and in column 343 otherwise.

Thus, for the above manner of relation, the relationship CONTAINS and REVISES are identified as being in the forward direction while the relationships IS_ALSO and REQUESTED_BY are identified as being the reverse direction. The corresponding values in column 342 of rows 351 and 354 and in column 343 of rows 353 and 356 are substituted in the above manner of relation to generate {"Customer Jonathan Smith who", "is", "user jonathan who", "requested", "change order ECO123 which", "contains", "revised item line 120 which", "revises", "item BX4888"}.

Tag tool 150 then concatenates the information to be displayed for the enterprise objects and the relationships in the sequence of the determined manner of relation to generate the search result in the form of a single text. In one embodiment, each of the display column values is provided as a link to the corresponding enterprise object.

Thus, the search results of the above manner of relation is generated as "Customer Jonathan Smith who is user jonathan who requested change order ECO123 which contains revised item line 120 which revises item BX4888" (the underlined text representing links to the corresponding enterprise object). The search result is then sent as a response to the search request received from a requesting/client system. The search result may then be displayed as shown in display area 660.

It may be appreciated that the display of the search result in the form of a text containing information about the objects and relationships makes the manner of relation understandable to non-technical/business users. Further, the above operations may also be suitably modified to depict the manner of relation in a graphical manner (for example, in the form of a directed graph), as will be apparent to one skilled in the relevant arts by reading the disclosure provided herewith.

Thus, the searching for related enterprise objects is improved. It may be desirable that the users be facilitated to search for enterprise objects of interest based on the tags associated with the relationships.

Referring to FIG. 7, display area 700 enables a user to send a search request for items (as indicated by text 710) associated with specific tags. Display area 730 enables the user to specify the specific tags "Change Order:ECO123" to be matched in text field 741 and also the tags not be matched in text field 742. The user may then click/select button 750 (labeled "Search") to send a search request for determining the enterprise objects (of type ITEM) that are associated with the specific tags according to the tag data.

Table 770 displays the results of the search, that is, the items associated with the specific tags. It may be observed that rows 771 and 772 correspond to the rows 535 and 537 of table 500 (containing the tag data). Thus, users may be facilitated to search for specific enterprise objects based on the tags associated with the relationships. Further, the enterprise application may be designed to provide more information to the user based on the specified/derived relationships to improve productivity and decision making ability of the user.

It should be appreciated that the above-described features of tag tool 150 may be implemented in a combination of one or more of hardware, software, and firmware (though the below embodiment is described as being implemented in the form of software instructions). Further, though shown as a separate block/system in FIG. 1, some or all of the functions (e.g., providing the tags) of tag tool 150 can be integrated into each of the server systems. The description is continued with respect to an embodiment in which various features are operative by execution of corresponding software instructions.

11. Digital Processing System

Figure 8:
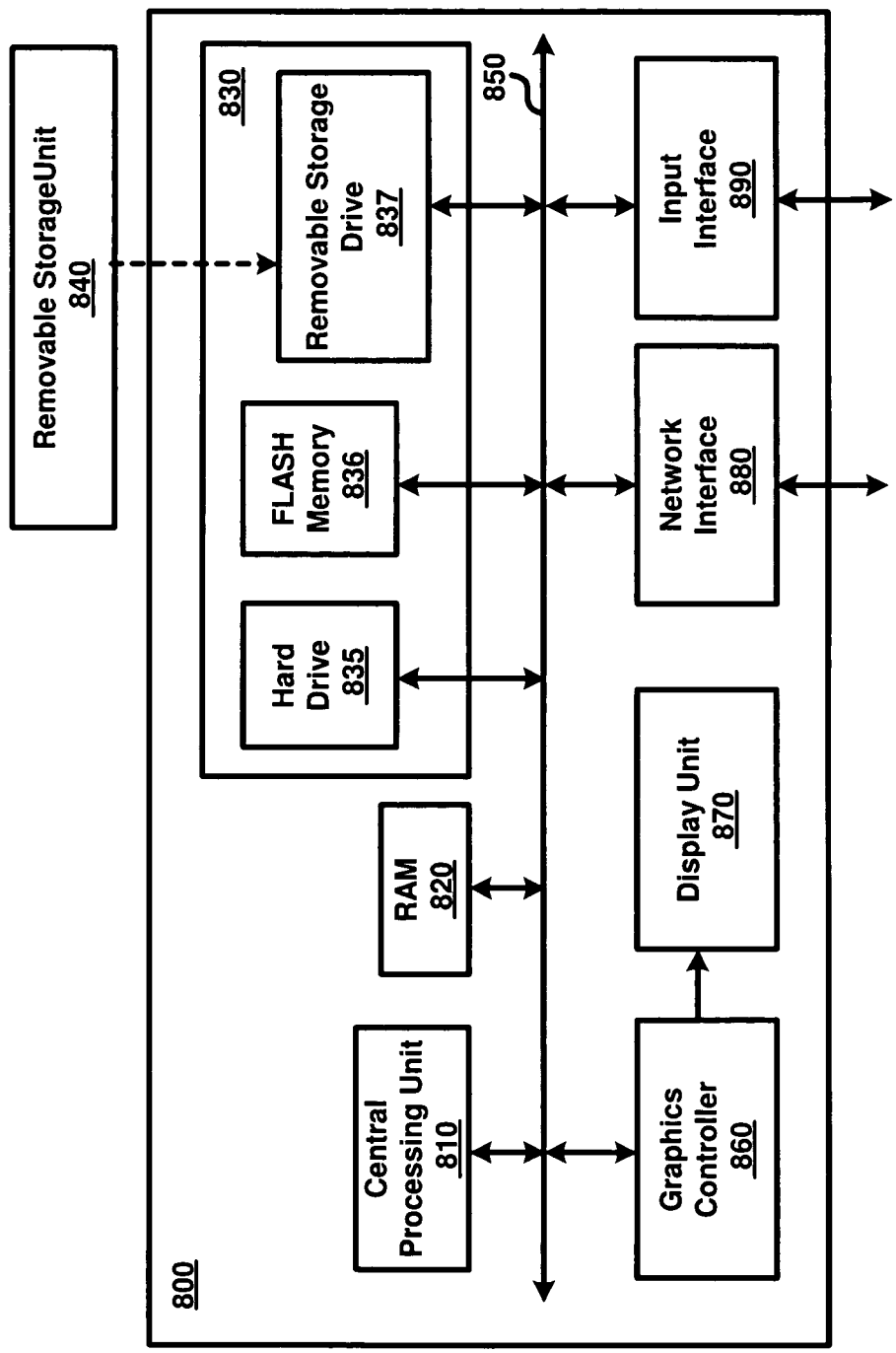
FIG. 8 is a block diagram illustrating the details of a digital processing system in which various aspects of the present invention are operative by execution of appropriate software instructions.

FIG. 8 is a block diagram illustrating the details of digital processing system 800 in which various aspects of the present invention are operative by execution of appropriate software instructions. Digital processing system 800 may correspond to any system implementing several features of the present invention (e.g., server systems 190A, 190B, tag tool 150) or to one of client systems 110A-110B.

Digital processing system 800 may contain one or more processors such as a central processing unit (CPU) 810, random access memory (RAM) 820, secondary memory 830, graphics controller 860, display unit 870, network interface 880, and input interface 890. All the components except display unit 870 may communicate with each other over communication path 850, which may contain several buses as is well known in the relevant arts. The components of FIG. 8 are described below in further detail.

CPU 810 may execute instructions stored in RAM 820 to provide several features of the present invention. CPU 810 may contain multiple processing units, with each processing unit potentially being designed for a specific task. Alternatively, CPU 810 may contain only a single general-purpose processing unit. RAM 820 may receive instructions from secondary memory 830 using communication path 850.

Graphics controller 860 generates display signals (e.g., in RGB format) to display unit 870 based on data/instructions received from CPU 810. Display unit 870 contains a display screen to display the images (e.g., portions of screens depicted in FIGS. 4, 6A and 7) defined by the display signals. Input interface 890 may correspond to a keyboard and a pointing device (e.g., touch-pad, mouse) and may be used to provide inputs (e.g., those depicted in FIGS. 4, 6A and 7). Network interface 880 provides connectivity to a network (e.g., using Internet Protocol), and may be used to communicate with other connected systems (such as client systems 110A-110B, tag tool 150, database servers 180A-180B and server systems 190A-190B) of FIG. 1.

Secondary memory 830 may contain hard drive 835, flash memory 836, and removable storage drive 837. Secondary memory 830 may store the data (e.g., portions of data depicted in FIGS. 3A, 3B, 3C, and 5 or portions of the tree depicted in FIG. 6B) and software instructions, which enable digital processing system 800 to provide several features in accordance with the present invention.

Some or all of the data and instructions may be provided on removable storage unit 840, and the data and instructions may be read and provided by removable storage drive 837 to CPU 810. Floppy drive, magnetic tape drive, CD-ROM drive, DVD Drive, Flash memory, removable memory chip (PCMCIA Card, EPROM) are examples of such removable storage drive 837.

Removable storage unit 840 may be implemented using medium and storage format compatible with removable storage drive 837 such that removable storage drive 837 can read the data and instructions. Thus, removable storage unit 840 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 840 or hard disk installed in hard drive 835. These computer program products are means for providing software to digital processing system 800. CPU 810 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

A module/block may be implemented as a hardware circuit containing custom very large scale integration circuits or gate arrays, off-the-shelf semiconductors such as logic chips, transistors or other discrete components. A module/block may also be implemented in programmable hardware devices such as field programmable gate arrays, programmable array logic, programmable logic devices, or the like.

Modules/blocks may also be implemented in software for execution by various types of processors. An identified module of executable code may, for instance, contain one or more physical or logical blocks of computer instructions which may, for instance, be organized as an object, procedure, or function. Nevertheless, the executables of an identified module need not be physically located together, but may contain disparate instructions stored in different locations which when joined logically together constitute the module/block and achieve the stated purpose for the module/block.

It may be appreciated that a module/block of executable code could be a single instruction, or many instructions and may even be distributed over several code segments, among different programs, and across several memory devices. Further, the functionality described with reference to a single module/block can be split across multiple modules/blocks or alternatively the functionality described with respect to multiple modules/blocks can be combined into a single (or other combination of blocks) as will be apparent to a skilled practitioner based on the disclosure provided herein.

Similarly, operational data may be identified and illustrated herein within modules and may be embodied in any suitable form and organized within any suitable type of data structure. The operational data may be collected as a single data set, or may be distributed over different locations including over different member disks, and may exist, at least partially, merely as electronic signals on a system or network.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the following description, numerous specific details are provided such as examples of programming, software modules, user selections, network transactions, database queries, database structures, hardware modules, hardware circuits, hardware chips, etc., to provide a thorough understanding of embodiments of the invention.

12. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A computing system comprising:
a database server to store data organized according to a plurality of object types and a plurality of relationship types, wherein each of said relationship types is designed to specify relationship between a pair of object types contained in said plurality of object types;
a server system to store a plurality of object instances in said database server, each of said plurality of object instances being one of said plurality of object types,
wherein pairs of object instances are related by a relationship type corresponding to the object types of the pair to form a plurality of relationships,
wherein each of said plurality of object instances and the corresponding ones of said plurality of relationships are created and stored in said database server in response to processing corresponding transactions; and
a tag tool operable to:
maintain a tag data containing a plurality of tags, said tag tool to add corresponding set of tags to said plurality of tags in response to processing each transaction, each tag being in the form of text identifying object instances and relationships created for processing a related subset of transactions, wherein each tag is stored associated with a corresponding subset of said plurality of relationships created for processing a corresponding related subset of transactions;
receive a search request containing a first object instance, a second object instance and a search tag, wherein said search tag is in the form of a first text;
determine a sequence of ordered pairs of object instances, wherein each ordered pair of object instances has a corresponding one of a sequence of relationships, wherein each of said sequence of relationships has an associated tag containing said first text representing said search tag,
each ordered pair of object instances containing a first entry and a second entry, the first entry of a first ordered pair of said sequence of ordered pairs equaling said first object instance, the second entry of a last ordered pair of said sequence of ordered pairs equaling said second object instance, the first entry of each of said sequence of ordered pairs equaling the second entry of a previous ordered pair in said sequence of ordered pairs; and
send said sequence of ordered pairs of object instances and said sequence of relationships as a response to said search request, such that a user can be displayed a manner in which said first object instance is related to said second object instance in the context of a desired subset of transactions identified by said search tag.

2. The computing system of claim 1, wherein said server system is designed to execute an enterprise application designed to process transactions, and during processing of corresponding transactions to create and store said plurality of object instances and said plurality of relationships in said database server,
said enterprise application also designed to form said plurality of tags as said tag data and to interface with said tag tool to store said tag data associated with respective related subset of transactions during processing of the related subset of transactions.

3. The computing system of claim 2, wherein said plurality of relationships is of a relationship type selected from a group of 'contains', 'created', 'requested by', 'assigned to', 'revises' and 'is_also',
wherein said enterprise application is designed to implement processing of change order transactions,
wherein each of said plurality of of object instances is of a object type selected from a group of 'change_order', 'revised_item_line', 'user', 'item', 'item_revision' and 'customer'.

4. The computing system of claim 3, wherein said first object instance is of said 'customer' type and specifies a name value,
said second object instance is of said 'item' type and specifies an item identifier,
said search tag specifies a search text,
wherein each of said sequence of relationships has an associated tag containing text matching said search text,
said sequence of ordered pairs of object instances and said sequence of relationships indicating at least one potential relation between a customer with said name value and an item with said item identifier.

5. The computing system of claim 2, to examine said tag data, said tag tool being operable to:
select a matching set of relationships, each having a corresponding associated tag matching the content of said search tag;
identify a first level of relationships contained in said matching set of relationships, wherein each of said first level of relationships has said first object instance as one of the pair of object instances comprising the relationship;
form a first level of intermediate objects comprising the other ones of the pair of objects comprising each of said first level of relationships;
determine whether said second object instance is present in said first level of intermediate objects;
if said second object instance is determined to be not present,
iteratively continue to identify a subsequent level of relationships and to form a corresponding subsequent level of intermediate objects until said second object instance is determined to be present, wherein said subsequent level of relationships is contained in said matching set of relationships and each of said subsequent level of relationship has at least one of a previous level of intermediate objects as one of the pair of object instances comprising the relationship; and
otherwise include one intermediate object at each level which leads to the determination of said second object instance to connect said first object instance to said second object instance.

6. The computing system of claim 5, wherein said tag tool is designed to maintain a setup data specifying a set of relationship types that can exist among a set of object types, wherein each of said plurality of object instances is of one of said set of object types and each of said plurality of relationships is one of said set of relationship types, wherein said enterprise application is further operable to:
receive a transaction requiring formation of a set of objects;
determine an object type corresponding to each of said set of objects, said object type being contained in said set of object types;
form said set of objects, wherein said set of objects are thereafter comprised in said plurality of object instances, and wherein each of said set of objects is associated with a corresponding identifier;
create a set of entries by examining said setup data and data received associated with said transaction, wherein each entry contains corresponding object types and identifiers of a source object and a destination object comprised in said set of objects, the entry further containing a corresponding associated tag and a relationship type, said associated tag being based on the data received associated with the transaction, said corresponding relationship type being contained in said set of relationship types; and
add said set of entries to said tag data.

7. A non-transitory machine readable medium storing one or more sequences of instructions causing a system to provide a search facility, wherein execution of said one or more sequences of instructions by one or more processors contained in said system causes said system to perform the actions of:
storing information in the form of a plurality of object instances and a plurality of relationships, each of said plurality of relationships specifying a pair of object instances having the corresponding relationship type,
wherein each of said plurality of object instances and the corresponding ones of said plurality of relationships are created and stored in response to processing corresponding transactions;
providing a corresponding one of a plurality of tags for each of said plurality of relationships, wherein the provided tag is stored associated with the corresponding relationship in the form of a tag data, wherein each tag is stored associated with a corresponding subset of said plurality of relationships created for processing a corresponding related subset of transactions;
receiving a search request including a first object instance, a second object instance and a search tag, wherein said search tag is in the form of a first text;
examining said tag data to determine the manner in which said first object instance is related to said second object instance in the context of said search tag,
said manner specifying a sequence of ordered pairs of object instances, wherein each ordered pair of object instances has a corresponding one of a sequence of relationships,
wherein each of said sequence of relationships has an associated tag matching said search tag, wherein the associated tag matches said search tag if a second text representing said associated tag contains said first text representing said search tag,
each ordered pair of object instances containing a first entry and a second entry, the first entry of a first ordered pair of said sequence of ordered pairs equaling said first object instance, the second entry of a last ordered pair of said sequence of ordered pairs equaling said second object instance, the first entry of each of said sequence of ordered pairs equaling the second entry of a previous ordered pair in said sequence of ordered pairs; and
sending a response to said search request indicating said manner in which said first object instance is related to said second object instance in the context of said search tag,
wherein said sequence of ordered pairs of object instances are displayed with said sequence of relationships to depict the manner in which said first object instance is related to said second object instance in the context of said search tag.

8. The non-transitory machine readable medium of claim 7, further comprising one or more instructions for:
executing an enterprise application designed to form and store said plurality of object instances and said plurality of relationships, said enterprise application also causing storing of said plurality of tags associated with respective relationships.

9. The non-transitory machine readable medium of claim 8, wherein said examining comprises:
selecting a matching set of relationships, each having a corresponding associated tag matching the content of said search tag;
identifying a first level of relationships contained in said matching set of relationships, wherein each of said first level of relationships has said first object instance as one of the pair of object instances specified by the relationship;
forming a first level of intermediate objects comprising the other ones of the pair of object instances specified by each of said first level of relationships;
determining whether said second object instance is present in said first level of intermediate objects;

if said second object instance is determined to be not present, iteratively continuing to identify a subsequent level of relationships and to form a corresponding subsequent level of intermediate objects until said second object instance is determined to be present, wherein said subsequent level of relationships is contained within said matching set of relationships and each of said subsequent level of relationship has at least one of a previous level of intermediate objects as one of the pair of object instances comprising the relationship; and otherwise including one intermediate object at each level which leads to the determination of said second object instance to connect said first object instance to said second object instance.

10. The non-transitory machine readable medium of claim 8, further comprising one or more instructions for:

maintaining a setup data specifying a set of relationship types that can exist among a set of object types, wherein each of said plurality of object instances is of one of said set of object types and each of said plurality of relationships is one of said set of relationship types;

determining the object types corresponding to each of a set of objects required to be formed as part of a transaction;

forming said set of objects, wherein said set of objects are thereafter comprised in said plurality of object instances, and wherein each of said set of objects is associated with a corresponding identifier;

creating a set of entries by examining said setup data and data received associated with said transaction, wherein each entry contains corresponding object types and identifiers of a source object and a destination object comprised in said set of objects, the entry further containing a corresponding associated tag and a relationship type, said associated tag being based on the data received associated with the transaction, said corresponding relationship type being contained in said set of relationship types; and adding said set of entries to said tag data.

11. A method of providing a search facility, said method comprising:

storing information in the form of a plurality of object instances and a plurality of relationships, each of said plurality of relationships specifying a pair of object instances having the corresponding relationship type, wherein each of said plurality of object instances and the corresponding ones of said plurality of relationships are created and stored in response to processing corresponding transactions;

providing a corresponding one of a plurality of tags for each of said plurality of relationships, wherein the provided tag is stored associated with the corresponding relationship in the form of a tag data, wherein each tag is stored associated with a corresponding subset of said plurality of relationships created for processing a corresponding related subset of transactions;

receiving a search request including a first object instance, a second object instance and a search tag, wherein said search tag is in the form of a first text;

examining said tag data to determine the manner in which said first object instance is related to said second object instance in the context of said search tag, said manner specifying a sequence of ordered pairs of object instances, wherein each ordered pair of object instances has a corresponding one of a sequence of relationships, wherein each of said sequence of relationships has an associated tag matching said search tag, wherein the associated tag matches said search tag if a second text representing said associated tag contains said first text representing said search tag, each ordered pair of object instances containing a first entry and a second entry, the first entry of a first ordered pair of said sequence of ordered pairs equaling said first object instance, the second entry of a last ordered pair of said sequence of ordered pairs equaling said second object instance, the first entry of each of said sequence of ordered pairs equaling the second entry of a previous ordered pair in said sequence of ordered pairs; and sending a response to said search request indicating said manner in which said first object instance is related to said second object instance in the context of said search tag, wherein said sequence of ordered pairs of object instances are displayed with said sequence of relationships to depict the manner in which said first object instance is related to said second object instance in the context of said search tag.

12. The method of claim 11, further comprising:

executing an enterprise application designed to form and store said plurality of object instances and said plurality of relationships, said enterprise application also causing storing of said plurality of tags associated with respective relationships.

13. The method of claim 12, wherein said examining comprises:

selecting a matching set of relationships, each having a corresponding associated tag matching the content of said search tag;

identifying a first level of relationships contained in said matching set of relationships, wherein each of said first level of relationships has said first object instance as one of the pair of object instances specified by the relationship;

forming a first level of intermediate objects comprising the other ones of the pair of object instances specified by each of said first level of relationships;

determining whether said second object instance is present in said first level of intermediate objects;

if said second object instance is determined to be not present, iteratively continuing to identify a subsequent level of relationships and to form a corresponding subsequent level of intermediate objects until said second object instance is determined to be present, wherein said subsequent level of relationships is contained within said matching set of relationships and each of said subsequent level of relationship has at least one of a previous level of intermediate objects as one of the pair of object instances comprising the relationship; and otherwise including one intermediate object at each level which leads to the determination of said second object instance to connect said first object instance to said second object instance.

14. The method of claim 12, further comprising:

maintaining a setup data specifying a set of relationship types that can exist among a set of object types, wherein each of said plurality of object instances is of one of said set of object types and each of said plurality of relationships is one of said set of relationship types;

determining the object types corresponding to each of a set of objects required to be formed as part of a transaction;

forming said set of objects, wherein said set of objects are thereafter comprised in said plurality of object instances, and wherein each of said set of objects is associated with a corresponding identifier;

creating a set of entries by examining said setup data and data received associated with said transaction, wherein each entry contains corresponding object types and identifiers of a source object and a destination object comprised in said set of objects, the entry further containing a corresponding associated tag and a relationship type, said associated tag being based on the data received associated with the transaction, said corresponding relationship type being contained in said set of relationship types; and adding said set of entries to said tag data.

* * * * *

UNITED STATES PATENT AND TRADEMARK OFFICE
CERTIFICATE OF CORRECTION

PATENT NO. : 9,501,474 B2  
APPLICATION NO. : 12/173835  
DATED : November 22, 2016  
INVENTOR(S) : Gopalakrishnan Page 1 of 1

It is certified that error appears in the above-identified patent and that said Letters Patent is hereby corrected as shown below:

In the Drawings

On sheet 2 of 10, in FIG. 2, under Reference Numeral 290, Line 1, delete "respone" and insert -- response --, therefor.

Signed and Sealed this  
Twentieth Day of June, 2017

Joseph Matal  
*Performing the Functions and Duties of the*  
*Under Secretary of Commerce for Intellectual Property and*  
*Director of the United States Patent and Trademark Office*